US012612563B2

(12) United States Patent
Yu et al.

(10) Patent No.: US 12,612,563 B2
(45) Date of Patent: Apr. 28, 2026

(54) CATALYTIC CRACKING ADDITIVE, PREPARATION METHOD THEREFOR, AND APPLICATION THEREOF

(71) Applicants:CHINA PETROLEUM & CHEMICAL CORPORATION, Beijing (CN); RESEARCH INSTITUTE OF PETROLEUM PROCESSING, SINOPEC, Beijing (CN)

(72) Inventors: Shanqing Yu, Beijing (CN); Jiasong Yan, Beijing (CN); Jiexiao Zhang, Beijing (CN); Wei Lin, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 216 days.

(21) Appl. No.: 18/001,868

(22) PCT Filed: Jun. 17, 2021

(86) PCT No.: PCT/CN2021/100467
§ 371 (c)(1),
(2) Date: Dec. 14, 2022

(87) PCT Pub. No.: WO2021/254410
PCT Pub. Date: Dec. 23, 2021

(65) Prior Publication Data
US 2023/0313050 A1      Oct. 5, 2023

(30) Foreign Application Priority Data
Jun. 17, 2020    (CN) .......................... 202010555732.2

(51) Int. Cl.
*C10G 11/05*        (2006.01)
*B01J 29/76*        (2006.01)
*B01J 35/61*        (2024.01)
*B01J 35/63*        (2024.01)
*B01J 37/04*        (2006.01)

(52) U.S. Cl.
CPC ........... *C10G 11/05* (2013.01); *B01J 29/7615* (2013.01); *B01J 35/615* (2024.01); *B01J 35/633* (2024.01); *B01J 37/04* (2013.01); *B01J 2229/186* (2013.01); *B01J 2229/37* (2013.01)

(58) Field of Classification Search
CPC ............................. B01J 29/7615; C10G 11/05
See application file for complete search history.

(56) References Cited

U.S. PATENT DOCUMENTS

| | | | |
|---|---|---|---|
| 3,758,403 A | 9/1973 | Rosinski et al. | |
| 4,837,396 A | 6/1989 | Herbst et al. | |
| 5,151,394 A | 9/1992 | Chitnis et al. | |
| 5,243,121 A | 9/1993 | Madon et al. | |
| 2009/0325786 A1* | 12/2009 | Liu ......................... | C04B 35/18 |
| | | | 502/79 |
| 2015/0174560 A1 | 6/2015 | Mcguire et al. | |

FOREIGN PATENT DOCUMENTS

| | | | |
|---|---|---|---|
| CN | 1055105 C | 8/2000 | |
| CN | 1872685 A | 12/2006 | |
| CN | 1915486 A | 2/2007 | |
| CN | 1916116 A | 2/2007 | |
| CN | 101332433 A | 12/2008 | |
| CN | 103785457 A | 5/2014 | |
| CN | 104998677 A | 10/2015 | |
| CN | 104998681 A | 10/2015 | |
| CN | 105013525 A | 11/2015 | |
| CN | 105618107 A | 6/2016 | |
| CN | 109499498 A | 3/2019 | |
| JP | 2010501341 A | 1/2010 | |
| JP | 2016128167 A | 7/2016 | |
| JP | 2017507772 A | 3/2017 | |
| TW | I308589 B | 4/2009 | |
| WO | 2011090121 A1 | 7/2011 | |
| WO | 2019055246 A2 | 3/2019 | |

OTHER PUBLICATIONS

English machine translation of CN 1916116 (Year: 2007).*
English machine translation of CN 104998681 (Year: 2018).*
Yang, Cuiding et al.; "Micro-reaction Test Method for Catalytic CrackingFresh Catalyst"; Petrochemical Analytical Method(RIPP Testing Method); RIPP 92-90; Year: 1990; pp. 263-268.

* cited by examiner

*Primary Examiner* — Renee Robinson
(74) *Attorney, Agent, or Firm* — NKL Law; Allen Xue

(57)          ABSTRACT
A catalytic cracking additive, its preparation and application thereof are provided. The catalytic cracking additive contains 10-50 wt % of a modified β zeolite, 20-85 wt % of a clay and 5-35 wt % of a boron-containing binder, based on the total weight of the catalytic cracking additive. The modified β zeolite comprises 0.1-1 wt % of CuO and 1-15 wt % of $P_2O_5$, and has a micro-activity index of at least 58; the boron-containing binder comprises 70-97 wt % of $Al_2O_3$ and 3-30 wt % of $B_2O_3$, and has a pH value of 1.0-3.5. The catalytic cracking additive can significantly improve the yield of C4 olefins and the concentration of C4 olefins in liquefied gas.

19 Claims, No Drawings

CATALYTIC CRACKING ADDITIVE, PREPARATION METHOD THEREFOR, AND APPLICATION THEREOF

CROSS REFERENCE TO RELATED APPLICATIONS

This application is a U.S. national stage entry of PCT international application No. PCT/CN2021/100467, filed on Jun. 17, 2021, which claims the priority of Chinese patent application No. 202010555732.2, titled "Catalytic cracking additive, preparation method therefor, and application thereof", filed on Jun. 17, 2020, the content of each is incorporated herein by reference in its entirety.

TECHNICAL FIELD

The present application relates to the technical field of catalytic cracking, particularly to a catalytic cracking additive, its preparation and application thereof.

BACKGROUND ART

Along with the enhancement of environmental awareness, the quality standards for automobile gasoline are continuously upgraded and updated. The new automotive gasoline standard GB17930-2016 clearly specifies that National Standard VI gasoline is implemented in stages from 2019. Compared with National Standard V, the benzene, aromatics and olefin contents of the gasoline under the National Standard VI are reduced, and current national gasoline blending component scheme is difficult to meet the requirements. Because alkylated gasolines have high octane number and zero contents of olefin, aromatics and benzene, they are good gasoline blending components under National Standard VI compared with traditional catalytic gasoline and reformed gasoline, and the proportion of alkylated gasolines in gasoline blending components will be greatly improved. Main feeds to alkylation units are isobutane and butenes. In the world, nearly 70% of butenes are obtained from catalytic cracking units, and the technology for producing butene fractions from catalytic cracking units has the advantages of low investment and low cost, and many companies try to obtain a greater yield of butenes from the catalytic cracking process.

In order to increase the yield of light olefins, shape-selective molecular sieves are usually added into the catalyst. Engelhard Corporation, U.S.A, first disclosed a cracking catalyst for increasing the yield of isobutene and isoamylene in 1993 in U.S. Pat. No. 5,243,121, wherein the lattice constant of the Y zeolite in the cracking catalyst was reduced through hydrothermal treatment, so that the selectivity of the catalyst to olefin in the product during hydrocarbon cracking can be improved, and a considerable amount of ZSM-5 zeolite can be added into the catalyst as an additive, so that the coke formation can be reduced, and the activity can be improved. U.S. Pat. No. 3,758,403 discloses a catalyst using ZSM-5 and a macroporous zeolite (mainly Y-type zeolite) as active components, which can increase the octane number of gasoline and increase the yield of C3 and C4 olefins, wherein the macroporous zeolite cracks the feedstock to produce gasoline and diesel oil, and the ZSM-5 shaped-selective molecular sieve further cracks them to produce light olefins.

Due to the structural particularity, β zeolite has both acid catalytic capacity and structural selectivity, and has been rapidly developed into a novel catalytic material in recent years. There are also many reports on the use of β zeolite in the catalytic cracking catalyst for the production of light olefins. U.S. Pat. No. 4,837,396 discloses a catalyst comprising a β zeolite and a Y zeolite, which further comprises a metal ionic compound as a stabilizer to improve the hydrothermal stability and mechanical strength of the catalyst. The stabilizer can directly act with the β zeolite, and can also be introduced in the preparation process. CN1,055,105C discloses a cracking catalyst for producing more isobutene and isoamylene, which comprises 6-30 wt % of phosphorus- and rare earth-containing high-silica zeolite with five-membered ring, 5-20 wt % of USY zeolite, 1-5 wt % of β zeolite, 30-60 wt % of clay and 15-30 wt % of inorganic oxide. The catalyst has the advantage of producing more isobutene and isoamylene while producing a high-octane gasoline under catalytic cracking conditions. CN104,998,681A discloses a catalytic cracking additive for increasing the concentration of light olefins and the preparation thereof, wherein the additive comprises a phosphorus- and metal-containing boron-modified β molecular sieve, an inorganic oxide binder, a Group VIII metallic additive, a phosphorus additive and optionally a clay. When used in catalytic cracking of petroleum hydrocarbons, the catalytic cracking additive can increase the concentration of isobutene in catalytic cracking liquefied gas and reduce the yield of coke.

When used in the catalytic cracking process, the various catalysts/additives obtained in the above prior arts can achieve the purpose of increasing the yield of C4 olefins to a certain extent, but have the main problems that: the yield of the liquefied gas is also increased as the yield of C4 olefins increases, and consequently there is no substantial change in the concentration of C4 olefins in the liquefied gas, indicating a poor selectivity to C4 olefins.

SUMMARY OF THE INVENTION

An object of the present application is to provide a catalytic cracking additive, its preparation and application thereof, which can significantly improve the yield of C4 olefins and the concentration of C4 olefins in liquefied gas.

To achieve the above object, the present application provides, in an aspect, a catalytic cracking additive, comprising 10-50 wt % of a modified β zeolite, 20-85 wt % of a clay, and 5-35 wt % of a boron-containing binder, based on the total weight of the catalytic cracking additive, wherein:

the modified β zeolite comprises 0.1-1 wt % of CuO and 1-15 wt % of $P_2O_5$, the modified β zeolite has a micro-activity index of at least 58;

the boron-containing binder comprises 70-97 wt % of $Al_2O_3$ and 3-30 wt % of $B_2O_3$, and has a pH value of 1.0-3.5.

In another aspect, there is provided a method for preparing a catalytic cracking additive according to the present application, comprising the steps of:

(1) mixing a β zeolite, a phosphorus source, a copper source and a first solvent, and adjusting the pH value of the mixture to 1.0-6.0 to obtain a slurry comprising a modified β zeolite;

(2) mixing and stirring an aluminum source, a boron source, an acid and a second solvent to obtain a boron-containing binder;

(3) mixing the boron-containing binder, the slurry comprising the modified β zeolite, a clay and a third solvent, and drying and calcining the resulting mixture to obtain the catalytic cracking additive.

In yet another aspect, the present application provides a catalyst composition, comprising the catalytic cracking additive according to the present application and a catalytic cracking catalyst.

In still another aspect, the present application provides a process for the catalytic cracking of a feedstock oil, comprising a step of contacting the feedstock oil with a catalytic cracking catalyst in the presence of the catalytic cracking additive according to the present application for reaction.

The catalytic cracking additive according to the present application has a high reactivity and a high selectivity to C4 olefins, and can improve the yield of C4 olefins and the concentration of C4 olefins in liquefied gas and reduce the yield of diesel oil, when used in the catalytic cracking of a feedstock oil.

Other characteristics and advantages of the present application will be described in detail in the detailed description hereinbelow.

DETAILED DESCRIPTION OF THE INVENTION

The present application will be further described hereinafter in detail with reference to specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the micro-activity indexes of the modified β zeolite and the catalytic cracking additive are measured by using a standard method of RIPP92-90 (See "Petrochemical Analysis Methods (RIPP Test Methods)", edited by Cuiding YANG et al., Science Press, Published in 1990, pages 263-268), wherein the modified β zeolite and the catalytic cracking additive shall be subjected to aging at 800° C. under 100% steam atmosphere for 17 hours before the micro-activity measurement.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

All of the patent and non-patent documents cited herein, including but not limited to textbooks and journal articles, are hereby incorporated by reference in their entirety.

In a first aspect, the present application provides a catalytic cracking additive comprising, based on the total weight of the catalytic cracking additive, 10-50 wt % of a modified β zeolite, 20-85 wt % of a clay, and 5-35 wt % of a boron-containing binder (also referred to herein as a modified binder), wherein:

the modified β zeolite comprises 0.1-1 wt % of CuO and 1-15 wt % of $P_2O_5$, the modified β zeolite has a micro-activity index of at least 58; and the boron-containing binder comprises 70-97 wt % of $Al_2O_3$ and 3-30 wt % of $B_2O_3$, and has a pH value of 1.0-3.5.

The catalytic cracking additive according to the present application comprises a β zeolite compositely modified by phosphorus and copper, has high specific surface area, excellent catalytic activity and selectivity to C4 olefins, and can remarkably improve the yield of C4 olefins and the concentration of C4 olefins in liquefied gas and reduce the yield of diesel oil, when used in the catalytic cracking process of feedstock oils.

In a preferred embodiment, the catalytic cracking additive comprises 20-50 wt % of the modified β zeolite, 20-70 wt % of the clay, and 10-35 wt % of the boron-containing binder. Further preferably, the catalytic cracking additive comprises 20-45 wt % of the modified β zeolite, 20-65 wt % of the clay and 10-30 wt % of the boron-containing binder.

According to the present application, the modified β zeolite may comprise 84-98.9 wt % of the β zeolite, 0.1-1 wt % of CuO, and 1-15 wt % of $P_2O_5$, and has a micro-activity index of at least 58. In a preferred embodiment, the modified β zeolite comprises 87.2-96.8 wt % of the β zeolite, 0.2-0.8 wt % of CuO, and 3-12 wt % of $P_2O_5$, and has a micro-activity index of 60 to 70. Further preferably, the modified β zeolite comprises 89.3-96.8 wt % of the β zeolite, 0.2-0.7 wt % of CuO and 3-10 wt % of $P_2O_5$, and has a micro-activity index of 60 to 68. According to the present application, the modified β zeolite may comprise only CuO, $P_2O_5$, and the β zeolite in the defined amounts, or may further comprise other modifiers, such as rare earths.

In a preferred embodiment, the boron-containing binder comprises 80-95 wt % of $Al_2O_3$ and 5-20 wt % of $B_2O_3$, has a molar ratio of B to Al of 0.05 to 0.5, and has a pH value of 1.0 to 3.5. In a further preferred embodiment, the boron-containing binder comprises 80-90 wt % of $Al_2O_3$ and 10-20 wt % of $B_2O_3$, has a molar ratio of B to Al of 0.1 to 0.4, and has a pH value of 1.5 to 3.0. Even more preferably, the boron-containing binder comprises 80-88 wt % of $Al_2O_3$ and 10-18 wt % of $B_2O_3$, has a molar ratio of B to Al of 0.15-0.35, and has a pH value of 1.8-3.0.

In a preferred embodiment, the catalytic cracking additive has a specific surface area of 150-300 m²/g, a pore volume of 0.30-0.45 mL/g as measured by water titration method, an attrition index of 0.5-3.0, and a micro-activity index of 35-60.

According to the present application, the clay used may be those well known to those skilled in the art useful for the preparation of catalysts, and may be selected from, for example, kaolin, rectorite, diatomite, montmorillonite, bentonite, sepiolite, or any combination thereof.

In a second aspect, the present application provides a method for preparing the catalytic cracking additive according to the present application, comprising the steps of:

(1) mixing a β zeolite, a phosphorus source, a copper source and a first solvent, and adjusting the pH value of the mixture to 1.0-6.0 to obtain a slurry comprising a modified β zeolite;

(2) mixing and stirring an aluminum source, a boron source, an acid and a second solvent to obtain a boron-containing binder;

(3) mixing the boron-containing binder, the slurry comprising the modified β zeolite, a clay and a third solvent, and drying and calcining the resulting mixture to obtain the catalytic cracking additive.

By using the method according to the present application, a catalytic cracking additive with a high catalytic activity and a high selectivity to C4 olefins can be obtained.

In a preferred embodiment, in step (1), the β zeolite, the phosphorus source, the copper source and the first solvent are mixed, and after adjusting the pH of the mixture to 1.0 to 6.0, the resulting mixture is mixed at 10 to 90° C. for 1 to 48 hours, preferably at 15 to 60° C. for 1 to 12 hours, more preferably at 40 to 60° C. for 2 to 6 hours.

According to the present application, the weight ratio of the β zeolite, the phosphorus source, the copper source and the first solvent used may vary within a wide range, and may for example be 1:(0.01-0.15):(0.001-0.01):(1-5), preferably 1:(0.03-0.12):(0.002-0.008):(1.5-3.5), wherein the phosphorus source is calculated as $P_2O_5$, and the copper source is calculated as CuO. Alternatively, the weight ratio of the β zeolite, the phosphorus source, the copper source, and the first solvent used may be 1:(0.05-0.16):(0.001-0.01):(1-5), preferably 1:(0.05-0.1):(0.005-0.01):(1.5-3.5), wherein the phosphorus source is calculated as $P_2O_5$, and the copper source is calculated as CuO.

In a preferred embodiment, the phosphorus source may be selected from orthophosphoric acid, phosphorous acid, ammonium phosphate, ammonium dihydrogen phosphate, diammonium hydrogen phosphate, aluminum phosphate, pyrophosphoric acid, or any combination thereof; the copper source may be selected from copper sulfate, copper chloride, copper nitrate, copper carbonate, copper acetate, or any combination thereof; the β zeolite may be selected from hydrogen-type β zeolite, sodium-type β zeolite, rare earth modified β zeolite or any combination thereof, preferably hydrogen-type β zeolite, wherein the rare earth metal in the rare earth modified β zeolite may be selected from La, Ce, Pr and the like.

In a preferred embodiment, the step (2) may comprise mixing the aluminum source, the boron source and the second solvent, stirring for 0.5-5 hours at 10-90° C., adding thereto an acid and further stirring for 0.5-5 hours until the pH value of the resulting slurry is 1.0-3.5. Preferably, the step (2) may comprise mixing the aluminum source, the boron source and the second solvent, stirring at 10-60° C. for 0.5-3 hours, adding thereto the acid and further stirring for 1-4 hours until the pH value of the resulting slurry is 1.5-3.0.

In a preferred embodiment, the molar ratio of the boron source (calculated as B) to the aluminum source (calculated as Al) used in step (2) is in a range of 0.05 to 0.5, preferably 0.1 to 0.4, more preferably 0.15 to 0.35.

According to the present application, the acid may be any of various mineral acids or organic acids known to those skilled in the art, for example, hydrochloric acid, sulfuric acid, nitric acid, oxalic acid, acetic acid, citric acid, or any combination thereof, preferably hydrochloric acid.

In a preferred embodiment, the second solvent may be selected from deionized water, distilled water, decationized water, ethanol, or any combination thereof, preferably deionized water.

In a preferred embodiment, in step (2), the aluminum source may be selected from pseudo-boehmite, alumina, aluminum hydroxide, boehmite, or any combination thereof, more preferably pseudo-boehmite. The boron source may be selected from boric acid, aluminum borate, boron trifluoride, or any combination thereof, more preferably boric acid.

In a preferred embodiment, hydrochloric acid is used as the mineral acid in step (2), the concentration of which may vary within a wide range, and may be, for example, 10-36 wt %, preferably 20-36 wt %; the weight ratio of the aluminum source to the hydrochloric acid used may vary within a wide range and may, for example, be 1:(0.1-0.3), preferably 1:(0.15-0.25), and the aluminum source is calculated as $Al_2O_3$.

According to the present application, the boron-containing binder obtained in step (2) may have a solid content of 15-50 wt %, preferably 25-40 wt %.

In a preferred embodiment, in step (3), the drying temperature is 60-200° C., and the drying time is 1-24 hours, and further preferably, the drying temperature is 80-180° C. and the drying time is 2-12 hours; the calcining temperature is 300-650° C. and the calcining time is 1-hours, and further preferably, the calcining temperature is 350-500° C. and the calcining time is 1-3 hours.

According to the present application, the drying of step (3) can be carried out in any manner known to those skilled in the art. For example, in a particular embodiment, the drying may be spray drying at an outlet temperature of 130° C. to 200° C., where the time of spray drying is not particularly limited; in another particular embodiment, the drying may be oven drying, which may be performed in a constant temperature drying oven at a temperature of 60-200° C. for a time of 2-24 hours.

According to the present application, the calcining of step (3) may also be carried out in a manner known to those skilled in the art. For example, the calcining may be performed in a muffle furnace or a tube furnace, and the calcining atmosphere is not particularly limited, and may be, for example, an air atmosphere or an inert atmosphere, and the inert atmosphere may comprise an inert gas, which may be nitrogen, helium, argon, or any combination thereof.

According to the present application, the clay may be any of various clay known to those skilled in the art useful for the preparation of catalysts, and may be selected from, for example, kaolin, rectorite, diatomite, montmorillonite, bentonite, sepiolite, or any combination thereof.

In a third aspect, the present application provides a catalyst composition comprising the catalytic cracking additive according to the present application and a catalytic cracking catalyst.

In a fourth aspect, the present application provides a process for the catalytic cracking of a feedstock oil, comprising a step of contacting the feedstock oil with a catalytic cracking catalyst in the presence of the catalytic cracking additive according to the present application.

In a fifth aspect, there is provided the use of the catalytic cracking additive according to the present application in catalytic cracking of a feedstock oil.

When used in a catalytic cracking process, the catalytic cracking additive according to the present application can be added into a catalytic cracking reactor, separately from a catalytic cracking catalyst or in a mixture with it. In a preferred embodiment, the catalytic cracking additive is used in an amount of 1-50 wt %, preferably 2-40 wt %, based on the total amount of the catalytic cracking additive and the catalytic cracking catalyst.

The catalytic cracking additive of the present application is suitable for use in combination with various conventionally used catalytic cracking catalysts, and there is no particular limitation herein. In a preferred embodiment, the catalytic cracking catalyst may comprise 10-50 wt % of a molecular sieve, 10-70 wt % of a clay, and 5-60 wt % of a binder. Further preferably, the molecular sieve can be one or more selected from the group consisting of Y molecular sieve, X molecular sieve, ZSM molecular sieve, R molecular sieve, MCM molecular sieve and aluminum phosphate zeolite; the clay may be one or more selected from the group consisting of kaolin, metakaolin, sepiolite, attapulgite, montmorillonite, rectorite, diatomite, halloysite, saponite, bentonite and hydrotalcite; the binder may be one or more selected from the group consisting of alumina binder, silica binder, zirconia binder, silica-alumina binder, and titania binder.

For example, the molecular sieve may be one or more selected from the group consisting of Y molecular sieve, X molecular sieve, SAPO molecular sieve, and ZSM-5 molecular sieve; the clay may be one or more selected from the group consisting of kaolin, montmorillonite, rectorite, diatomite and saponite, and the binder may be one or more selected from the group consisting of alumina sol, silica gel, silica-alumina composite sol, aluminum phosphate sol, acidified pseudo-boehmite binder, zirconia sol and titania sol, preferably pseudo-boehmite and alumina sol. For example, the catalytic cracking catalyst may comprise 2-15 wt %, preferably 3-10 wt %, of an aluminum sol (calculated as alumina), or 10-30 wt %, preferably 15-25 wt %, of pseudo-boehmite (calculated as alumina).

Particularly, the catalytic cracking catalyst may be a catalytic cracking catalyst comprising a Y molecular sieve, which may be commercially available or prepared according to existing methods, such as the catalyst described in Chinese Patent No. ZL201410594419.4, which comprises 10-60 wt % of a Y molecular sieve, 10-60 wt % of a clay and 5-50 wt % of a binder. The Y molecular sieve is one or more selected from the group consisting of HY, REY, REHY, REUSY and USY, Y molecular sieve prepared by a gas phase chemical method (a method for Al removal and Si supplementing with $SiCl_4$), a Y molecular sieve prepared by a liquid phase chemical method (a method for Al removal and Si supplementing with $(NH_4)_2SiF_6$), and modified Y zeolite obtained by modifying the above Y molecular sieves with phosphorus and/or a modifying metal, wherein the metal is one or more selected from the group consisting of alkaline earth metal, Group IVB metal, Group VII metal and Group VIII metal. The catalytic cracking catalyst may further comprise a matrix material such as one or more selected from silica-alumina material, and alumina material comprising an additive.

The catalytic cracking process of the present application is applicable to various conventional feedstock oils, and there is no particular limitation herein. The feedstock oil is one or more selected from the group consisting of atmospheric gas oil, vacuum gas oil, atmospheric residual oil, vacuum residual oil, propane deasphalted oil, butane deasphalted oil, coking wax oil, hydrogenated LCO, hydrogenated HCO and hydrogenated residual oil.

The catalytic cracking process of the present application can be carried out under conventional catalytic cracking conditions, and there is no particular limitation herein. In a preferred embodiment, the catalytic cracking process is carried out under conditions including: a reaction temperature of 480-550° C., a reaction pressure of 0.1-0.3 Mpa, a reaction time of 2-4 s, and a weight ratio of catalyst to feedstock oil of 4-10.

In some particularly preferred embodiments, the present application provides the following technical solutions:

1. A catalytic cracking additive, comprising, based on the total weight of the catalytic cracking additive, 10-50 wt % of a modified β zeolite, 20-85 wt % of a clay and 5-35 wt % of a modified binder, wherein:

the modified β zeolite comprises 0.1-1 wt % of CuO and 1-15 wt % of $P_2O_5$, and a micro-activity index of 58 or more;

the modified binder comprises 80-95 wt % of $Al_2O_3$ and 5-20 wt % of $B_2O_3$, has a molar ratio of B to Al of 0.05-0.5, and a pH value of 1.0-3.5.

2. The catalytic cracking additive of Item 1, wherein the catalytic cracking additive comprises 20-50 wt % of the modified β zeolite, 20-70 wt % of the clay, and 10-35 wt % of the modified binder.

3. The catalytic cracking additive of Item 1, wherein the modified β zeolite comprises 0.2-0.8 wt % of CuO and 3-12 wt % of $P_2O_5$, and has a micro-activity index of 60 to 70.

4. The catalytic cracking additive of Item 1, wherein the modified binder comprises 80-90 wt % of $Al_2O_3$ and 10-20 wt % of $B_2O_3$, has a molar ratio of B to Al of 0.1 to 0.4, and a pH value of 1.5 to 3.0.

5. The catalytic cracking additive of Item 1, wherein the catalytic cracking additive has a specific surface area of 150-300 m²/g, a pore volume of 0.3-0.45 mL/g as measured by water titration method, an attrition index of 0.5-3.0%, and a micro-activity index of 35-60.

6. The catalytic cracking additive of Item 1, wherein the clay is one or more selected from kaolin, rectorite, diatomite, montmorillonite, bentonite and sepiolite.

7. A method for preparing a catalytic cracking additive of any of Items 1 to 6, comprising:

(1) mixing a β zeolite, a phosphorus source, a copper source and a first solvent, and adjusting the pH value of the mixture to 1.0-6.0 to obtain a slurry comprising a modified β zeolite;

(2) mixing and stirring an aluminum source, a boron source, a mineral acid and a second solvent to obtain a modified binder;

(3) mixing the modified binder, the slurry comprising the modified β zeolite, a clay and a third solvent, and drying and calcining the resulting mixture.

8. The method of Item 7, wherein, in step (1), the temperature of the mixing is 10-90° C.;

the weight ratio of the β zeolite, the phosphorus source, the copper source and the first solvent is 1:(0.05-0.16):(0.001-0.01):(1-5), wherein the phosphorus source is calculated as $P_2O_5$, and the copper source is calculated as CuO;

preferably, the weight ratio of the β zeolite, the phosphorus source, the copper source and the first solvent is 1:(0.05-0.1):(0.005-0.01):(1.5-3.5).

9. The method of Item 7, wherein step (2) comprises mixing the aluminum source, the boron source and the second solvent, stirring for 0.5-5 hours at 10-90° C., adding thereto the mineral acid, and further stirring for 0.5-5 hours.

10. The method of Item 7, wherein, in step (2), the hydrochloric acid has a concentration of 10-36 wt %; the weight ratio of the aluminum source to the hydrochloric acid is 1:(0.1-0.3), wherein the aluminum source is calculated as $Al_2O_3$.

11. The method of Item 7, wherein the drying is performed at a temperature of 60-200° C. for 1-24 hours; and the calcining is performed at a temperature of 300-650° C. for 1-5 hours.

12. The method of Item 7, wherein the phosphorus source is one or more selected from the group consisting of ortho-phosphoric acid, phosphorous acid, ammonium phosphate, ammonium dihydrogen phosphate, diammonium hydrogen phosphate, aluminum phosphate, and pyrophosphoric acid;

the copper source is one or more selected from the group consisting of copper sulfate, copper chloride, copper nitrate, copper carbonate and copper acetate;

the aluminum source is one or more selected from the group consisting of pseudo-boehmite, alumina, aluminum hydroxide and boehmite;

the β zeolite is one or more selected from the group consisting of hydrogen-type β zeolite, sodium-type β zeolite and rare earth modified β zeolite;

the clay is one or more selected from the group consisting of kaolin, rectorite, diatomite, montmorillonite, bentonite and sepiolite;

the boron source is one or more selected from the group consisting of boric acid, aluminum borate and boron trifluoride;

the mineral acid is one or more selected from the group consisting of hydrochloric acid, sulfuric acid, nitric acid, acetic acid, citric acid and oxalic acid;

the first solvent, the second solvent and the third solvent are each independently one or more selected from the group consisting of deionized water, distilled water, decationized water and ethanol.

13. Use of the catalytic cracking additive of any of Items 1 to 6 in the catalytic cracking of a feedstock oil.

14. The use of Item 13, wherein the catalytic cracking additive is present in an amount of 1-50 wt %, based on the total amount of the catalytic cracking additive and the catalytic cracking catalyst.

EXAMPLES

The present application will be further illustrated with reference to the following examples, but the present application is not limited thereto.

Reagents and Starting Materials:

the kaolin is available from Suzhou Kaolin Corporation, and has a solid content of 76 wt %;

the pseudo-boehmite is available from Shandong Aluminum Plant and has an alumina content of 62.0 wt %;

the alumina sol is available from Sinopec Catalyst Co., Ltd., and has an alumina content of 21.5 wt %;

the hydrochloric acid is available from Beijing Chemical Plant, and has an analytical purity, and a mass concentration of 36%;

the phosphoric acid is available from Beijing Chemical Plant, and has an analytical purity, and a mass concentration of 85%;

the diammonium hydrogen phosphate is available from Beijing Chemical Plant, and has an analytical purity and a $P_2O_5$ content of 52.3 wt %;

the ammonium dihydrogen phosphate is available from Beijing chemical plant, and has an analytical purity, and a $P_2O_5$ content of 60.5 wt %;

the hydrogen-type β zeolite is available from Sinopec Catalyst Co., Ltd., and has a solid content of 75 wt %, a molar ratio of $SiO_2$ to $Al_2O_3$ of 25, and a $Na_2O$ content of 0.15 wt %.

the rare earth modified β zeolite is available from Sinopec Catalyst Co., Ltd., and has a solid content of 75 wt %, a $Na_2O$ content of 0.12% and a $RE_2O_3$ content of 2%.

Other reagents used in the following examples, unless otherwise specified, are available from Sinopharm Chemical Reagent Co., Ltd., and have an analytical purity.

Methods for Measurement:

Measurement of specific surface area: the measurement was carried out in accordance with low-temperature static nitrogen adsorption volume method using ASAP 2405N V1.01 Automatic Adsorption Instrument of Micromeritics Instrument Corporation, U.S.A, in which the sample was degassed at 300° C. for 4 h under vacuum at $1.33 \times 10^{-2}$ Pa and the adsorption-desorption isotherm of the sample was measured at 77.4K using $N_2$ as an adsorption medium, and the specific surface area ($S_{BET}$) of the sample was calculated according to the BET equation.

Measurement of pore volume by water titration method: the pore volume of the test sample was determined by water titration method according to Q/SH 3360-206;

Measurement of attrition index: the attrition index of the test sample was determined by tube method according to Q/SH 3360-208;

Analysis of the composition of the modified β zeolite, the boron-containing binder and the catalytic cracking additive: the measurement was performed by X-ray Fluorescence Spectroscopy (XRF) according to ASTM D1977-98;

Analysis of element content: the mass content of B and Al in the boron-containing binder was measured by chemical analysis ICP, and the molar ratio of B to Al can be obtained by conversion in accordance with method well known to those skilled in the art, of which a detailed description is omitted herein.

Micro-activity index: the light oil micro-activity of the modified β zeolite and the catalytic cracking additive was evaluated in accordance with a RIPP92-90 standard method, at a sample loading of 5.0 g, and a reaction temperature of 460° C., with a straight-run light cycle oil having a distillation range of 235-337° C. as the feedstock oil, the product composition was analyzed by gas chromatography, and the micro-activity index was calculated based on the composition of the product.

When measuring the micro-activity index of the modified β zeolite, the solid in the slurry comprising the modified β zeolite was collected by filtering, dried and calcined at 500° C. for 3 hours, aged for 17 hours under 100% steam at 800° C., and then subjected to measurement of the micro-activity index in accordance with the RIPP92-90 method.

Micro-activity index=(yield of gasoline boiled at a temperature of less than 216° C. in the product+gas yield+coke yield)/total feed×100%.

Examples 1-8 are provided to illustrate the catalytic cracking additive of the present application and preparation thereof, and Comparative Examples 1-4 are provided to illustrate catalytic cracking additives falling out of the scope of the present application and preparation thereof.

Example 1

(1) 267 g of hydrogen-type β zeolite was slurried with 400 g of deionized water, 27.2 g of diammonium hydrogen phosphate and 3.13 g of copper sulfate pentahydrate were added, the pH of the mixture was adjusted to 4.0 with dilute hydrochloric acid (with a concentration of 20 wt %), and then stirred at 40° C. for 6 hours to obtain a slurry comprising a modified β zeolite. According to the analysis, the modified β zeolite had a $P_2O_5$ content of 2.9 wt %, a CuO content of 0.5 wt %, and a micro-activity index of 62.

(2) 154 g of pseudo-boehmite and 563 g of deionized water were mixed and slurried for 15 min, and uniformly dispersed; boric acid was added thereto, and stirred at room temperature (20° C., the same below) for 1 h; then 40 g of concentrated hydrochloric acid (with a concentration of 36 wt %) solution was slowly added, and the mixture was further stirred for 3 hours at room temperature, to obtain a boron-containing binder. According to the analysis, the boron-containing binder had an $Al_2O_3$ content of 79 wt %, a $B_2O_3$ content of 21 wt %, a molar ratio of B to Al of 0.37, a pH value of 2.5, and a solid content of 15 wt %.

(3) the slurry comprising the modified β zeolite obtained in step (1), the boron-containing binder obtained in step (2), 895 g of kaolin and 1500 g of deionized water were mixed and stirred uniformly, the resulting slurry was spray dried, and calcined at 450° C. for 2 h in an air atmosphere to obtain a catalytic cracking additive C1. The composition and properties of the catalytic cracking additive C1 are shown in Table 1.

Example 2

(1) 400 g of hydrogen-type β zeolite was slurried with 900 g of deionized water, 58.3 g of ammonium dihydrogen phosphate and 1.52 g of copper chloride were added thereto, and the mixture was adjusted to pH 3.0 with dilute hydrochloric acid (with a concentration of 25 wt %) and stirred at room temperature for 12 hours to obtain a slurry comprising a modified β zeolite. According to the analysis, the modified β zeolite had a $P_2O_5$ content of 12 wt %, a CuO content of 0.3 wt %, and a micro-activity index of 61.

(2) 301 g of pseudo-boehmite and 636 g of deionized water were mixed and slurried for 20 min, and uniformly dispersed; boric acid was added thereto, and stirred for 2 hours at 60° C.; then, 103 g of concentrated hydrochloric acid (with a concentration of 36 wt %) solution was slowly added, and the mixture was further stirred for 2 hours, to obtain a boron-containing binder. According to the analysis, the boron-containing binder had an $Al_2O_3$ content of 85 wt %, a $B_2O_3$ content of 15 wt %, a molar ratio of B to Al of 0.28, a pH value of 2.2, and a solid content of 20 wt %.

(3) the slurry comprising the modified R zeolite obtained in step (1), the boron-containing binder obtained in step (2), 632 g of kaolin and 2000 g of deionized water were mixed and stirred uniformly, the resulting slurry was spray dried, and calcined at 500° C. for 3 hours in an air atmosphere to obtain a catalytic cracking additive C2. The composition and properties of the catalytic cracking additive C2 are shown in Table 1.

Example 3

(1) 667 g of hydrogen-type β zeolite was slurried with 1000 g of deionized water, 64.9 g of phosphoric acid and 7.01 g of copper nitrate were added thereto, the pH of the mixture was adjusted to 3.0 with dilute phosphoric acid (with a concentration of 35 wt %), and the mixture was stirred at 60° C. for 2 hours to obtain a slurry comprising a modified R zeolite. According to the analysis, the modified R zeolite had a $P_2O_5$ content of 8 wt %, a CuO content of 0.6 wt % and a micro-activity index of 65.

(2) 435 g of pseudo-boehmite and 324 g of deionized water were mixed and slurried for 20 min and uniformly dispersed; boric acid was added thereto, and stirred for 2 hours at 60° C.; then 187 g of concentrated hydrochloric acid (with a concentration of 36 wt %) solution was slowly added thereto, and the mixture was further stirred for 2 hours to obtain a boron-containing binder. According to the analysis, the boron-containing binder had an $Al_2O_3$ content by mass of 90 wt %, a $B_2O_3$ content of 10 wt %, a molar ratio of B to Al of 0.18, a pH value of 3.5, and a solid content of 30 wt %.

(3) the slurry comprising the modified R zeolite obtained in step (1), the boron-containing binder obtained in step (2), 263 g of kaolin and 2000 g of deionized water were mixed and stirred uniformly, the resulting slurry was spray dried, and calcined at 450° C. for 2 hours in an air atmosphere to obtain a catalytic cracking additive C3. The composition and properties of the catalytic cracking additive C3 are shown in Table 1.

Example 4

(1) 533 g of hydrogen-type β zeolite was slurried with 1200 g of deionized water, 64 g of ammonium dihydrogen phosphate and 1.87 g of copper nitrate were added, the mixture was adjusted to pH 4.0 with dilute hydrochloric acid (with a concentration of 30 wt %), and then stirred at 60° C. for 5 hours to obtain a slurry comprising a modified β zeolite. According to the analysis, the modified β zeolite had a $P_2O_5$ content of 10 wt %, a CuO content of 0.2 wt %, and a micro-activity index of 63.

(2) 508 g of pseudo-boehmite and 1182 g of deionized water were mixed and slurried for 30 min, and uniformly dispersed; boric acid was added thereto, and stirred for 1 h at room temperature; then 193 g of concentrated hydrochloric acid (with a concentration of 36 wt %) solution was slowly added, and the mixture was further stirred for 3 hours at room temperature, to obtain a boron-containing binder. According to the analysis, the boron-containing binder had an $Al_2O_3$ content of 90 wt %, a $B_2O_3$ content of 10 wt %, a molar ratio of B to Al of 0.18, a pH value of 3.3, and a solid content of 18 wt %.

(3) the slurry comprising the modified β zeolite obtained in step (1), the boron-containing binder obtained in step (2), 329 g of kaolin and 2000 g of deionized water were mixed and stirred uniformly, the resulting slurry was spray dried, and calcined at 500° C. for 1.5 h in an air atmosphere to obtain a catalytic cracking additive C4. The composition and properties of the catalytic cracking additive C4 are shown in Table 1.

Example 5

(1) 333 g of hydrogen-type β zeolite was slurried with 1000 g of deionized water, 24.36 g of phosphoric acid and 3.38 g of copper chloride were added, the pH of the mixture was adjusted to 2.5 with dilute hydrochloric acid (with a concentration of 25 wt %), and the mixture was stirred at 90° C. for 2 hours to obtain a slurry comprising a modified β zeolite. According to the analysis, the modified β zeolite had a $P_2O_5$ content of 6 wt %, a CuO content of 0.8 wt %, and a micro-activity index of 68.

(2) 132 g of pseudo-boehmite and 193 g of deionized water were mixed and slurried for 20 min, and uniformly dispersed; boric acid was added thereto, and stirred for 2 hours at 60° C.; then 45.6 g of concentrated hydrochloric acid (with a concentration of 36 wt %) solution was slowly added, and the mixture was further stirred for 2 hours to obtain a boron-containing binder. According to the analysis, the boron-containing binder had an $Al_2O_3$ content of 82 wt %, a $B_2O_3$ content of 18 wt %, a molar ratio of B to Al of 0.33, a pH value of 2.8, and a solid content of 25 wt %.

(3) the slurry comprising the modified β zeolite obtained in step (1), the boron-containing binder obtained in step (2), 855 g of kaolin and 2000 g of deionized water were mixed and stirred uniformly, the resulting slurry was spray dried, and calcined at 500° C. for 5 hours in an air atmosphere to obtain a catalytic cracking additive C5. The composition and properties of the catalytic cracking additive C5 are shown in Table 1.

Example 6

A catalytic cracking additive C6 was prepared as described in Example 1, except that, in step (1), 267 g of hydrogen-type β zeolite was slurried with 400 g of deionized water, 7.44 g of diammonium hydrogen phosphate and 0.63 g of copper sulfate pentahydrate were added thereto, the pH of the mixture was adjusted to 4.0 with dilute hydrochloric acid (with a concentration of 20 wt %), and then stirred at 40° C. for 6 hours, to obtain a slurry comprising a modified β zeolite. According to the analysis, the modified β zeolite had a $P_2O_5$ content of 1.8 wt %, a CuO content of 0.1 wt %, and a micro-activity index of 58.

The composition and properties of the catalytic cracking additive C6 are shown in Table 1.

Example 7

A catalytic cracking additive C7 was prepared as described in Example 1, except that, in step (2), 184 g of pseudo-boehmite and 563 g of deionized water were mixed and slurried for 15 min and dispersed uniformly; boric acid was added thereto, and stirred for 1 h at room temperature (20° C.); then 35 g of concentrated hydrochloric acid (with a concentration of 36 wt %) solution was slowly added, and the mixture was further stirred for 3 hours at room temperature to obtain a boron-containing binder. According to the analysis, the boron-containing binder had an $Al_2O_3$ content of 95 wt %, a $B_2O_3$ content of 5 wt %, a molar ratio of B to Al of 0.09, a pH value of 3.4, and a solid content of 15 wt %.

The composition and properties of the catalytic cracking additive C7 are shown in Table 1.

Example 8

(1) 133 g of rare earth modified β zeolite was slurried with 200 g of deionized water, 9.3 g of diammonium hydrogen phosphate and 1.56 g of copper sulfate pentahydrate were added thereto, the pH of the mixture was adjusted to 4.0 with dilute hydrochloric acid (with a concentration of 20 wt %), and the mixture was stirred at 40° C. for 6 hours to obtain a slurry comprising a modified β zeolite. According to the analysis, the modified β zeolite had a $P_2O_5$ content of 4.8 wt %, a CuO content of 0.5 wt % and a micro-activity index of 62.

(2) 69 g of aluminum hydroxide and 216 g of deionized water were mixed and slurried for 15 min, and uniformly dispersed; 14.6 g of boron trifluoride was added thereto, and stirred at room temperature (20° C., the same below) for 1 hour; then 18 g of concentrated nitric acid (with a concentration of 85 wt %) solution was slowly added, and the mixture was further stirred for 3 hours at room temperature, to obtain a boron-containing binder. According to the analysis, the boron-containing binder had an $Al_2O_3$ content of 84.5 wt %, a $B_2O_3$ content of 15.5 wt %, a molar ratio of B to Al of 0.27, a pH value of 1.2 and a solid content of 15 wt %.

(3) the slurry comprising the modified β zeolite obtained in step (1), the boron-containing binder obtained in step (2), 1118 g of rectorite and 1500 g of deionized water were mixed and stirred uniformly, the resulting slurry was spray dried, and calcined at 450° C. for 2 hours in an air atmosphere to obtain a catalytic cracking additive C8. The composition and properties of the catalytic cracking additive C8 are shown in Table 1.

TABLE 1

| Compositions and physicochemical properties of the catalytic cracking additives obtained in Examples 1 to 8 | | | | | | | | |
|---|---|---|---|---|---|---|---|---|
| Example No. | Ex. 1 | Ex. 2 | Ex. 3 | Ex. 4 | Ex. 5 | Ex. 6 | Ex. 7 | Ex. 8 |
| Catalytic cracking additive No. | C1 | C2 | C3 | C4 | C5 | C6 | C7 | C8 |
| Modified β zeolite, wt % | 20 | 30 | 50 | 40 | 25 | 20 | 20 | 10 |
| Clay, wt % | 68 | 48 | 20 | 40 | 65 | 68 | 68 | 85 |
| Boron-containing binder, wt % | 12 | 22 | 30 | 20 | 10 | 12 | 12 | 5 |
| Total, wt % | 100 | 100 | 100 | 100 | 100 | 100 | 100 | 100 |
| Properties of the catalytic cracking additive | | | | | | | | |
| Specific surface area, $m^2/g$ | 210 | 251 | 295 | 222 | 230 | 180 | 186 | 179 |
| Pore volume measured by water titration method, mL/g | 0.38 | 0.39 | 0.41 | 0.42 | 0.39 | 0.32 | 0.33 | 0.33 |
| Attrition index, % | 1.8 | 2.1 | 1.1 | 1.5 | 1.5 | 2.6 | 3.0 | 2.9 |
| MA (800° C./17 h) | 44 | 40 | 52 | 50 | 43 | 38 | 38 | 36 |

Comparative Example 1

2000 g of deionized water and 632 g of kaolin were added into a reaction kettle and slurried at room temperature for 60 minutes, 300 g of hydrogen-type β zeolite (the micro-activity index of the hydrogen-type β zeolite after being aged under steam at 800° C. for 17 hours is 45) was mixed and slurried for 30 minutes, 1000 g of alumina sol was added thereto and stirred for 30 minutes, the resulting slurry was spray dried, and calcined at 500° C. for 3 hours to obtain a comparative catalytic cracking additive D1. The composition and properties of the catalytic cracking additive D1 are shown in Table 2.

Comparative Example 2

A ferrophosphorus modified β zeolite was prepared in accordance with the method described in Example 4 of Chinese patent application No. CN1872685A, and then a catalytic cracking additive was prepared as follows with reference to Example 2 of the present application:

2000 g of deionized water and 632 g of kaolin were added into a reaction kettle and slurried for 60 minutes at room temperature, 355 g of pseudo-boehmite was added, and further stirred for 30 minutes, then 55 g of concentrated hydrochloric acid (with a concentration of 36 wt %) solution was added thereto at a mass ratio of the hydrochloric acid to the alumina of 0.25, and the resulting mixture was stirred for 90 minutes, 300 g of the ferrophosphorus modified β zeolite was added thereto, and slurried for 30 minutes; finally, 93 g of alumina sol was added to the slurry, and stirred for 30 minutes, the resulting slurry having a solid content of 28 wt % was spray dried and then calcined at 500° C. for 3 hours to obtain a catalytic cracking additive D2. The composition and properties of the catalytic cracking additive D2 are shown in Table 2.

Comparative Example 3

A modified β molecular sieve comprising phosphorus and copper was prepared in accordance with the method described in Example 2 of Chinese patent application No. CN104998681A as follows:

(1) a β zeolite was subjected to ion exchange with a NH₄Cl solution and washing until a Na₂O content lower than 0.2 wt % was obtained, and the resultant was filtered to obtain a filter cake;

(2) the filter cake obtained in step (1) was dried, and the resultant was calcined at 150° C. for 2 hours, then heated to 350° C. in 30 minutes, calcined for 2 hours, further heated to 500° C. in 30 minutes, and calcined for 4 hours to obtain a molecular sieve;

(3) water was added to 100 g (on a dry basis) of the molecular sieve obtained in step (2) to obtain a molecular sieve slurry with a solid content of 40 wt %, the molecular sieve slurry was mixed with a solution prepared by dissolving 11.8 g of H₃PO₄ (with a concentration of 85 wt %) and 6.3 g of CuCl₂ in 90 g of water, impregnated and dried to obtain a sample;

(4) the sample obtained in step (3) was calcined at 550° C. for 2 hours to obtain a modified β molecular sieve comprising phosphorus and copper.

According to the measurement, the modified zeolite β had a P₂O₅ content of 7.2 wt %, a CuO content of 3.7 wt %, and a micro-activity index of 50.

Then, a catalytic cracking additive was prepared in accordance with Example 18 of CN104998681A as follows:

300 g of the modified β molecular sieve comprising phosphorus and copper, 632 g of kaolin and 355 g of pseudo-boehmite were taken, decationized water and aluminum sol were added and slurried for 120 minutes, an aqueous solution of FeCl₃·6H₂O (with a FeCl₃ concentration of 30 wt %) was added under stirring to obtain a slurry with a solid content of 30 wt %. Hydrochloric acid was added to obtain a pH of the slurry of 3.0, and slurried for 45 minutes, then an aluminum phosphate sol was into the slurry, stirred for 30 minutes, and then the resulting slurry was spray dried under conditions including an inlet temperature of dry gas of 500° C. and a temperature of tail gas of 180° C. to obtain microspheres with an average particle diameter of 65 micrometers. The microspheres were calcined at 500° C. for 1 hour. The resulting microspheres were mixed with an aqueous diammonium hydrogen phosphate solution with a concentration of 5 wt % at a weight ratio of 1:10 under stirring, the mixture was heated to 60° C., and reacted for 20 minutes at a constant temperature, filtered in vacuum and dried, and then calcined for 2 hours at 500° C. to obtain a catalytic cracking additive D3. The composition and properties of the catalytic cracking additive D3 are shown in Table 2.

Comparative Example 4

A modified β molecular sieve comprising phosphorus and copper was prepared in accordance with Comparative Example 3 as follows:

(1) a β zeolite was subjected to ion exchange with a NH₄Cl solution and washing until a Na₂O content lower than 0.2 wt % was obtained, and the resultant was filtered to obtain a filter cake;

(2) the filter cake obtained in step (1) was dried, and the resultant was calcined at 150° C. for 2 hours, then heated to 350° C. in 30 minutes, calcined for 2 hours, further heated to 500° C. in 30 minutes, and calcined for 4 hours to obtain a molecular sieve;

(3) water was added to 100 g (on a dry basis) of the molecular sieve obtained in step (2) to obtain a molecular sieve slurry with a solid content of 40 wt %, the molecular sieve slurry was mixed with a solution prepared by dissolving 11.8 g of H₃PO₄ (with a concentration of 85 wt %) and 6.3 g of CuCl₂ in 90 g of water, stirred at room temperature for 6 hours, to obtain a slurry of a modified β zeolite comprising phosphorus and copper.

A boron-containing binder was prepared in accordance with the method described in the Example 7 of Chinese patent application No. CN 109499498A as follows:

1613 g of pseudo-boehmite and 1958 g of deionized water were mixed, slurried and uniformly dispersed; 947 g of zirconium oxychloride ZrOCl₂·8H₂O and 103 g of ethanol were added to the slurry, heated to 80° C. and stirred for 1 hour; then 302 g of boric acid was slowly added, and further stirred for 2 h at 80° C., then 284 g of hydrochloric acid solution (with a concentration of 36 wt %) was added, and stirred for 3 h, to obtain a boron-containing binder. The binder had an Al₂O₃ content of 66.9 wt %, a B₂O₃ content of 9.0 wt %, a ZrO₂ content of 24.1 wt %, a molar ratio of B to Al of 0.20, a pH value of 1.1, and a solid content of 28 wt %.

The slurry of the modified β zeolite comprising phosphorus and copper, the boron-containing binder, 632 g of kaolin and 2000 g of deionized water were mixed and uniformly stirred, the resulting slurry was spray dried, and calcined at 450° C. for 2 hours in an air atmosphere, to obtain a catalytic cracking additive D4. The composition and properties of the catalytic cracking additive D4 are shown in Table 2.

TABLE 2

Composition and physicochemical properties of the catalytic cracking additives obtained in Comparative Examples 1-4

| Example No. | Comp. Ex. 1 | Comp. Ex. 2 | Comp. Ex. 3 | Comp. Ex. 4 |
|---|---|---|---|---|
| Catalytic cracking additive No. | D1 | D2 | D3 | D4 |
| β zeolite, wt % | 30 | 30 | 30 | 30 |
| Kaolin, wt % | 48 | 48 | 48 | 48 |
| Binder, wt % | 22 | 22 | 22 | 22 |
| Total, wt % | 100 | 100 | 100 | 100 |
| Properties of the catalytic cracking additive | | | | |
| Specific surface area, m$^2$/g | 90 | 104 | 134 | 100 |
| Pore volume measured by water titration method, mL/g | 0.32 | 0.33 | 0.36 | 0.34 |
| Attrition index, % | 2.0 | 3.9 | 2.2 | 3.5 |
| MA (800° C./17 h) | 28 | 30 | 32 | 31 |

Application Examples 1 to 8

The catalytic cracking additives C1-C8 obtained in Examples 1-8 of the present application were mixed with an industrial catalyst (available from Qilu Branch of Sinopec Catalyst Co., Ltd., of which the main properties are shown in Table 3) under the industrial brand SGC-1, respectively, at a pre-determined ratio to obtain a catalyst composition, and the catalyst composition was aged at 800° C. for 17 hours under 100% steam on a fixed bed aging apparatus. Then, an evaluation was performed on an ACE apparatus, and the properties of the feedstock oil used for the evaluation are shown in Table 4, and the evaluation conditions and results are shown in Table 5.

The conversion rate=gasoline yield+liquefied gas yield+dry gas yield+coke yield;

Butene concentration=butene yield/liquefied gas yield×100%.

TABLE 3

Properties of the industrial catalyst SGC-1

| Properties | SGC-1 |
|---|---|
| Chemical composition/wt % | |
| RE$_2$O$_3$ | 3.4 |
| Al$_2$O$_3$ | 52.3 |
| Na$_2$O | 0.16 |
| Physical Properties | |
| Specific surface area/(m$^2$/g) | 269 |
| Pore volume/(mL/g) | 0.38 |
| Bulk density/(g × cm$^{-3}$) | 0.75 |
| Size distribution, by mass/%) | |
| 0-20 mm | 1.5 |
| 0-40 mm | 12.8 |
| 0-149 mm | 90.1 |
| APS mm | 76.8 |
| Attrition index/(%) | 1.2 |
| MA (800° C./4 h) | 78 |

TABLE 4

Properties of the feedstock oil

| Properties | Feedstock oil |
|---|---|
| Density (20° C.), g/cm$^3$ | 0.9044 |
| Refractive index (20° C.) | 1.5217 |
| Viscosity (100° C.), mm$^2$/s | 9.96 |
| Freezing point, ° C. | 40 |
| Aniline point, ° C. | 95.8 |
| C, m % | 85.98 |
| H, m % | 12.86 |
| S, m % | 0.55 |
| N, m % | 0.18 |
| Carbon residue, m % | 3.0 |
| Distillation range, ° C. | |
| Initial boiling point | 243 |
| 5% | 294 |
| 10% | 316 |
| 30% | 395 |
| 50% | 429 |
| 70% | 473 |
| 90% | — |

Comparative Application Examples 1 to 4

The catalytic cracking additives D1-D4 obtained in Comparative Examples 1 to 4 were evaluated in accordance with the method described in Application Examples 1-8, and the evaluation conditions and results are shown in Table 5.

TABLE 5

Evaluation conditions and results

| Example No. | Appl. Ex. 1 | Appl. Ex. 2 | Appl. Ex. 3 | Appl. Ex. 4 | Appl. Ex. 5 | Appl. Ex. 6 |
|---|---|---|---|---|---|---|
| Catalyst composition | 8 wt % C1 + 92% SGC-1 | 8 wt % C2 + 92% SGC-1 | 8 wt % C3 + 92% SGC-1 | 8 wt % C4 + 92% SGC-1 | 8 wt % C5 + 92% SGC-1 | 8 wt % C6 + 92% SGC-1 |
| Reaction temperature, ° C. | 500 | 500 | 500 | 500 | 500 | 500 |
| Catalyst-to-oil ratio | 5.92 | 5.92 | 5.92 | 5.92 | 5.92 | 5.92 |
| Weight hourly space velocity, h$^{-1}$ | 16 | 16 | 16 | 16 | 16 | 16 |
| Yield of cracked products, wt % | | | | | | |

TABLE 5-continued

| | | | | | |
|---|---|---|---|---|---|
| Dry gas | 1.48 | 1.77 | 1.75 | 1.90 | 1.90 | 1.47 |
| Liquefied gas | 17.39 | 17.81 | 17.95 | 18.11 | 17.79 | 17.33 |
| Gasoline | 47.00 | 46.27 | 46.25 | 46.27 | 46.16 | 46.28 |
| Diesel oil | 16.28 | 16.07 | 15.61 | 15.32 | 16.10 | 16.90 |
| Heavy oil | 10.69 | 10.71 | 11.00 | 10.90 | 10.72 | 10.99 |
| Coke | 7.15 | 7.37 | 7.44 | 7.50 | 7.33 | 7.12 |
| Total | 100.00 | 100.00 | 100.00 | 100.00 | 100.00 | 100.09 |
| Conversion rate, wt % | 73.02 | 73.22 | 73.39 | 73.78 | 73.18 | 72.20 |
| Liquefied gas yield + gasoline yield, wt % | 64.39 | 64.08 | 64.20 | 64.38 | 63.95 | 63.61 |
| Butene yield, wt % | 5.64 | 6.03 | 6.12 | 6.45 | 5.86 | 5.44 |
| Butene concentration in liquefied gas, % | 32.43 | 33.86 | 34.09 | 35.62 | 32.94 | 31.39 |

Evaluation results

| Example number | Appl. Ex. 7 | Appl. Ex. 8 | Comp. Appl. Ex. 1 | Comp. Appl. Ex. 2 | Comp. Appl. Ex. 3 | Comp. Appl. Ex. 4 |
|---|---|---|---|---|---|---|
| Catalyst composition | 8 wt % C7 + 92% SGC-1 | 8 wt % C8 + 92% SGC-1 | 8 wt % D1 + 92% SGC-1 | 8 wt % D2 + 92% SGC-1 | 8 wt % D3 + 92% SGC-1 | 8 wt % D4 + 92% SGC-1 |
| Reaction temperature, ° C. | 500 | 500 | 500 | 500 | 500 | 500 |
| Catalyst-to-oil ratio | 5.92 | 5.92 | 5.92 | 5.92 | 5.92 | 5.92 |
| Weight hourly space velocity, $h^{-1}$ | 16 | 16 | 16 | 16 | 16 | 16 |
| Yield of cracked products, wt % | | | | | | |
| Dry gas | 1.66 | 1.66 | 1.18 | 1.79 | 1.72 | 1.8 |
| Liquefied gas | 17.05 | 17.00 | 17.28 | 16.66 | 16.17 | 16.42 |
| Gasoline | 46.17 | 46.12 | 44.63 | 46.21 | 46.72 | 45.86 |
| Diesel oil | 16.77 | 16.83 | 17.94 | 17.02 | 16.91 | 17.05 |
| Heavy oil | 10.93 | 11.11 | 11.55 | 11.00 | 11.40 | 11.61 |
| Coke | 7.42 | 7.28 | 7.42 | 7.35 | 7.08 | 7.25 |
| Total | 100.00 | 100.00 | 100.00 | 100.0 | 100.0 | 100.0 |
| Conversion rate, wt % | 72.30 | 72.06 | 70.51 | 72.01 | 71.69 | 71.33 |
| Liquefied gas yield + gasoline yield, wt % | 63.22 | 63.12 | 61.91 | 62.87 | 62.89 | 62.28 |
| Butene yield, wt % | 5.37 | 5.32 | 4.86 | 5.15 | 5.02 | 5.08 |
| Butene concentration in liquefied gas, % | 31.50 | 31.29 | 28.13 | 30.91 | 31.05 | 30.94 |

From the results shown in Table 5, it can be seen that the total yield of gasoline and liquefied gas obtained in Application Example 2 of the present application is increased by 2.17, 1.21, 1.19 and 1.80 percentage points as compared to Comparative Application Examples 1 to 4, respectively; the yield of the diesel oil is reduced by 1.87, 0.95, 0.84 and 0.98 percentage points, respectively; the yield of the butylene is increased by 1.17, 0.88, 1.01 and 0.95 percentage points, respectively, and the concentration of butene in the liquefied gas is increased by 5.73, 2.95, 2.81 and 2.92 percentage points, respectively. Therefore, the catalytic cracking additive comprising the modified β zeolite of the present application has excellent yield and selectivity of C4 olefins, higher heavy oil cracking capability and better diesel oil conversion capability.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A catalytic cracking additive, comprising 10-50 wt % of a modified β zeolite, 20-85 wt % of a clay, and 5-35 wt % of a boron-containing binder, based on the total weight of the catalytic cracking additive, wherein:

the modified β zeolite is the only zeolite present in the catalytic cracking additive and comprises 0.1-1 wt % of CuO and 1-15 wt % of $P_2O_5$, and has a micro-activity index of at least 58; and the boron-containing binder comprises 70-97 wt % of $Al_2O_3$ and 3-30 wt % of $B_2O_3$, and has a pH value of 1.0-3.5, wherein the catalytic cracking additive is prepared by a method comprising the steps of:

S1: mixing a B zeolite, a phosphorus source, a copper source and a first solvent, and adjusting the pH value of the mixture to 1.0-6.0 to form a slurry;

S2: mixing an aluminum source, a boron source, an acid and a second solvent to obtain the boron-containing binder, the aluminum source being the sole alumina source for the catalytic cracking additive and is selected from pseudo-boehmite, alumina, aluminum hydroxide, boehmite, and combinations thereof, and S3: mixing the boron-containing binder, the slurry, a clay and a third solvent, and drying the resulting mixture and calcining the dried mixture at 300-650° C. to obtain the catalytic cracking additive.

2. The catalytic cracking additive according to claim 1, wherein the boron-containing binder comprises 80-90 wt % of $Al_2O_3$ and 10-20 wt % of $B_2O_3$, and has a molar ratio of B to Al of 0.1-0.4, and a pH value of 1.5-3.0.

3. The catalytic cracking additive according to claim 1, wherein the catalytic cracking additive has a specific surface area of 150-300 $m^2/g$, a pore volume of 0.3-0.45 mL/g as measured by water titration method, an attrition index of 0.5-3.0%, and a micro-activity index of 35-60.

4. The catalytic cracking additive according to claim 1, wherein the clay is selected from kaolin, rectorite, diatomite, montmorillonite, bentonite, sepiolite, and combinations thereof.

5. The catalytic cracking additive according to claim 1, wherein in step S1 of the preparation method, the mixing is performed at a temperature of 10-90° C. for 1-48 hours, a weight ratio of the β zeolite, the phosphorus source, the copper source, and the first solvent is 1:(0.01-0.15):(0.001-0.01):(1-5), wherein the phosphorus source is calculated as $P_2O_5$, and the copper source is calculated as CuO.

6. The catalytic cracking additive according to claim 1, wherein the step S2 of the preparation method comprises: mixing the aluminum source, the boron source and the second solvent, stirring at a temperature of 10-90° C. for 0.5-5 hours, adding thereto the acid, and further stirring for 0.5-5 hours until a pH value of the resulting slurry is 1.0-3.5; and a molar ratio of the boron source (calculated as B) to the aluminum source (calculated as Al) used in step S2 is 0.05 to 0.5.

7. The catalytic cracking additive according to claim 1, wherein in step S2 of the preparation method, the acid is a mineral acid or an organic acid; and a weight ratio of the aluminum source to the acid is 1:(0.1-0.3), wherein the aluminum source is calculated as $Al_2O_3$.

8. The catalytic cracking additive according to claim 1, wherein in step S3 of the preparation method, the drying is performed at a temperature of 60-200° C. for 1-24 hours, and the calcining is carried out for 1-5 hours.

9. The catalytic cracking additive according to claim 1, wherein:

the phosphorus source is selected from orthophosphoric acid, phosphorous acid, ammonium phosphate, ammonium dihydrogen phosphate, diammonium hydrogen phosphate, aluminum phosphate, pyrophosphoric acid, and combinations thereof;

the copper source is selected from copper sulfate, copper chloride, copper nitrate, copper carbonate, copper acetate, and combinations thereof;

the β zeolite is selected from hydrogen-type β zeolite, sodium-type β zeolite, rare earth modified β zeolite, and combinations thereof;

the clay is selected from kaolin, rectorite, diatomite, montmorillonite, bentonite, sepiolite, and combinations thereof;

the boron source is selected from boric acid, aluminum borate, boron trifluoride, and combinations thereof;

the acid is selected from hydrochloric acid, sulfuric acid, nitric acid, oxalic acid, acetic acid, citric acid, and combinations thereof; or the first solvent, the second solvent, and the third solvent are each independently selected from deionized water, distilled water, decationized water, ethanol, and combinations thereof.

10. The catalytic cracking additive of claim 1, consisting essentially of 10-50 wt % of the modified B zeolite, 20-85 wt % of the clay, and 5-35 wt % of the boron-containing binder.

11. The catalytic cracking additive of claim 1, comprising 10-30 wt % of the modified β zeolite, 65-85 wt % of the clay, and 5-12 wt % of the boron-containing binder, based on the total weight of the catalytic cracking additive.

12. The catalytic cracking additive of claim 1, wherein the modified B zeolite comprises 0.2-0.8 wt % of CuO.

13. A catalyst composition, comprising the catalytic cracking additive according to claim 1 and a catalytic cracking catalyst.

14. The catalyst composition according to claim 13, wherein the catalyst composition comprises 1-50 wt % of the catalytic cracking additive and 50-99 wt % of the catalytic cracking catalyst, based on the weight of the catalyst composition.

15. The catalyst composition according to claim 14, wherein the catalyst composition comprises 2-40 wt % of the catalytic cracking additive and 60-98 wt % of the catalytic cracking catalyst, based on the weight of the catalyst composition.

16. The catalyst composition according to claim 13, wherein the catalytic cracking catalyst comprises 10-50 wt % of a molecular sieve, 10-70 wt % of a clay, and 5-60 wt % of a binder.

17. A process for the catalytic cracking of a feedstock oil, comprising a step of contacting the feedstock oil with a catalytic cracking catalyst in the presence of the catalytic cracking additive according to claim 1.

18. The process according to claim 17, wherein the catalytic cracking additive is used in an amount of 1-50 wt %, based on the total amount of the catalytic cracking additive and the catalytic cracking catalyst.

19. The process according to claim 18, wherein the catalytic cracking additive is in an amount of 2-40 wt %, based on the total amount of the catalytic cracking additive and the catalytic cracking catalyst.

* * * * *